United States Patent [19]
Ishida et al.

[11] Patent Number: 5,379,128
[45] Date of Patent: Jan. 3, 1995

[54] DOCUMENT TRANSPORT APPARATUS AND METHOD

[75] Inventors: Yoshitaka Ishida, Yokosuka; Manabu Kiri, Machida, both of Japan

[73] Assignee: Eastman Kodak Company, Rochester, N.Y.

[21] Appl. No.: 18,586

[22] Filed: Feb. 17, 1993

[30] Foreign Application Priority Data

Jun. 5, 1992 [JP] Japan ................... 4-145956

[51] Int. Cl.⁶ .............................................. H04N 1/40
[52] U.S. Cl. ............................ 358/449; 358/498; 358/474; 355/321; 355/316; 355/311; 355/308; 271/258; 271/260; 271/256
[58] Field of Search ........... 358/449, 498, 496, 488, 358/412, 401, 448, 494, 487, 474, 471, 497; 355/321, 308, 311, 206; 271/258, 259, 262, 263; 356/383; 250/223 R, 560

[56] References Cited

U.S. PATENT DOCUMENTS

| | | | |
|---|---|---|---|
| 5,010,364 | 4/1991 | Maekawa et al. | 271/263 |
| 5,105,078 | 4/1992 | Nochise et al. | 271/263 |
| 5,131,648 | 7/1992 | Ito | 271/262 |
| 5,164,846 | 11/1992 | Kim | 358/498 |
| 5,194,970 | 3/1993 | Iwanade | 358/498 |

FOREIGN PATENT DOCUMENTS

258347 10/1988 Japan.
1303251 12/1989 Japan.

*Primary Examiner*—Edward L. Coles, Sr.
*Assistant Examiner*—Fan Lee
*Attorney, Agent, or Firm*—Dennis R. Arndt

[57] ABSTRACT

A document transport apparatus provides continuous transport of documents input with a prescribed spacing between the documents, and can rapidly detect when documents close up or overlap. Detection of close up or overlap is made by measuring a length of each document by a transported document length measuring device and comparing the measured length with a predetermined length for that document measured by an input document length measuring device positioned upstream of the transported document length measuring device. If a measured length exceeds the predetermined length, a condition of close up or overlap is deemed to exist. The document transport apparatus is described in the context of its use in an image capture apparatus or scanner.

8 Claims, 3 Drawing Sheets

DOCUMENT TRANSPORT APPARATUS AND METHOD

FIELD OF THE INVENTION

The present invention relates to a document transport apparatus, and, more particularly, to a document transport apparatus of a type used in document scanners.

BACKGROUND OF THE INVENTION

In an image capture system an image scanner is used to scan a document and convert the document image to digital signals that can then be transmitted to a computer for processing. In digital form the document image can be readily stored, retrieved, duplicated and transmitted. Image capture systems are being used to provide high-speed processing of the growing quantities of information generated by modern society.

A typical image capture apparatus is equipped with a document transport apparatus that transports documents to a scanning section. It is also equipped with a document feeder that draws documents from a stack arranged in a document feed tray and feeds the documents one at a time at prescribed intervals to the document transport apparatus. In the document feeder, a counterclockwise rotation of a feed roller feeds a topmost document in the direction of the document transport apparatus. At the same time a counterclockwise rotation of a retard roller positioned below the feed roller serves to urge the documents below the topmost one back towards the document feed tray. In this way, documents are supplied separately one by one to the document transport apparatus which transports them to an image capture section where they are scanned.

To improve the efficiency of this scanning operation, the space between documents is made as small as possible, while at the same time document transport speeds are made as high as possible. Additionally, with the aim of decreasing the size of the apparatus, curved transport paths are used. This combination of factors leads to various problems. For example, unstable transport speeds result from slippage between documents and the surface of the conveying means. These unstable speeds and other such problems cause documents to overlap. After documents become overlapped, they are typically transported in that state.

At the scanning section such overlapped documents may be judged to be a single long document, resulting in these overlapped documents being incorrectly scanned. Because an image capture apparatus continues to operate normally as long as documents do not jam or other such operational malfunctions occur, it has been extremely difficult to detect such mis-scanned documents among a large number of documents being processed at high speed.

It is therefore desirable to provide a document transport apparatus that reacts immediately to overlapped documents so that any mis-scanning can be avoided or corrected.

SUMMARY OF THE INVENTION

The invention is directed to document transport method and apparatus that provides continuous transport of documents input with a prescribed spacing between the documents, and can rapidly detect when documents close up or overlap. Detection of close up or overlap is made by measuring a length of each document and comparing the measured length with a predetermined length for that document. If a measured length exceeds the predetermined length, a condition of close up or overlap is deemed to exist and transport of the documents is halted to permit correction of the condition.

Viewed from one aspect, the present invention is directed to a document transport apparatus. The apparatus comprises at least one transported document length measurement means positioned downstream of an input end of the apparatus for measuring the length of each of the transported documents by detecting the surface continuity of the documents in transport, a comparsion means, and a correction means. The comparison means sequentially compares a predetermined input document length with the measured transported document length for each document and produces an comparison signal. The correction means, which receives the comparison signal, halts document transport when the comparison signal indicates that the measured length is longer than the input document length.

Viewed from another aspect, the invention is directed to an image capture apparatus. The apparatus comprises an input document length measuring means for measuring length of each document at an input end of the apparatus, memory means for storing the lengths measured by the input document length measurement means, at least one transported document length measurement means positioned downstream of the input document length measurement means for measuring the length of each of the documents after the document has been transported, retrieval means for retrieving from the memory means the input document length of each document measured by the transported document length measurement means, comparison means for sequentially comparing the input document length with the transported document length and producing a comparison signal, and correction means, which receives the comparison signal, for halting document transport when a transported document length is longer than an input document length.

Viewed from still another aspect, the invention is directed to a method for sequentially transporting documents with a prescribed spacing between the documents. The method comprises the steps of measuring the length of each of the transported documents by detecting the surface continuity of the documents in transport, sequentially comparing a predetermined input document length for each document with the measured length of that document, and halting the document transport when a measured transported document length is longer than the predetermined length for that document.

The invention will be better understood from the following detailed description taken in consideration with the accompanying drawings and claims.

The drawings are not necessarily to scale.

DETAILED DESCRIPTION

Figure 1:
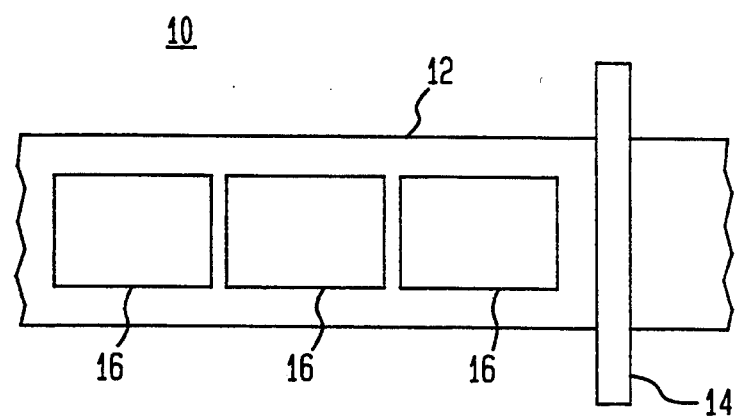
FIG. 1 is a schematic drawing of a portion of a prior art document transport apparatus with spaced documents thereon.

Referring now to FIG. 1, there is shown a portion of a prior art image capture apparatus 10. The apparatus 10 comprises a document transport member 12 and a scanner 14. The apparatus 10 comprises many other elements, but these are not shown for purposes of clarity. Individual documents 16 are shown in a substantially equally spaced arrangement on the document transport member 12. When the documents 16 are in this arrangement, the image capture apparatus 10 functions properly. That is, each of the individual documents 16 passes under the scanner 14 as a single and readily identifiable item. Thus an image from each of the documents 16 can be digitized and stored with a clearly defined identity.

Figure 2:
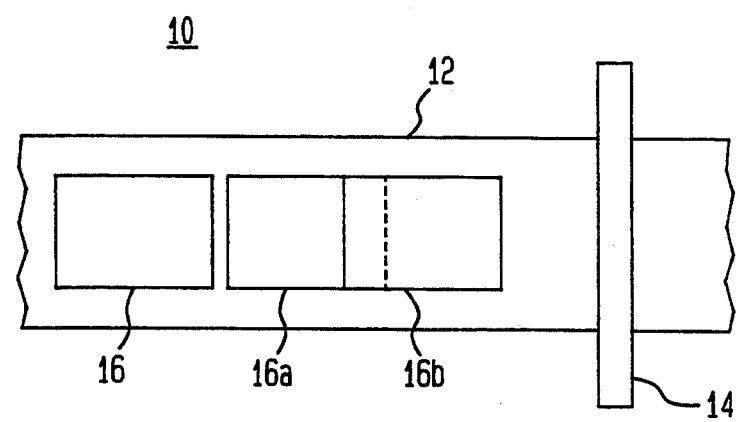
FIG. 2 is a schematic drawing of the portion of the document transport apparatus of FIG. 1 with overlapped documents thereon.

Referring now to FIG. 2, there is shown the prior art image capture apparatus 10 of FIG. 1 in a state of operation that produces improper results. Three documents are shown in FIG. 2. These documents are designated 16, 16a, and 16b. The document 16 is shown in a satisfactorily spaced relationship with respect to the document 16a. Documents 16a and 16b are shown in an overlapped relationship with one another. When the document 16b passes under the scanner 14, the image thereon is read completely. However, when the document 16a passes under the scanner, a portion of the document 16a is obscured by the overlapping document 16b. Consequently, the image data of the document 16a is improperly read by the scanner 14.

Figure 3:
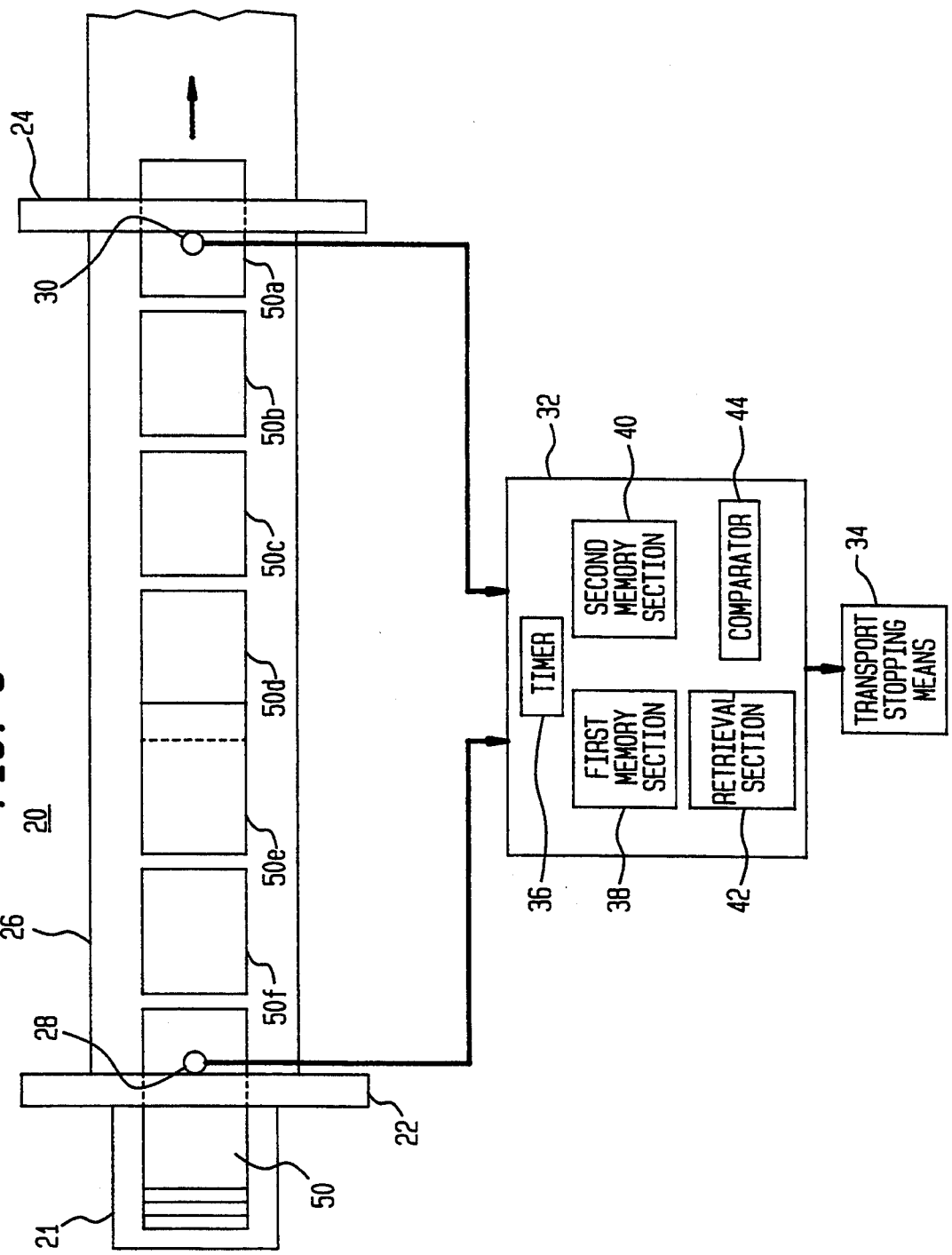
FIG. 3 is a schematic diagram of an image capture apparatus and a document transport apparatus in accordance with the present invention.

Referring now to FIG. 3, there is shown, in schematic form, an image capture apparatus 20 in accordance with the present invention. The image capture apparatus 20 comprises a document tray 21, a document feeder 22, a document scanner 24, a document transport member 26, first and second photosensors 28 and 30, respectively, a control unit 32, and a correction unit 34 which is shown as a transport stopping means in FIG. 3. The control unit 32 comprises a timer 36, first and second memory sections 38 and 40, respectively, a retrieval section 42, and a comparator 44. The photosensors 28 and 30 are coupled to the control unit 32. The control unit 32 is coupled to the correction unit 34. A combination of the document transport member 26, the first and second photosensors 28 and 30, the control unit 32 and the correction unit 34 is also designated herein as a document transport apparatus.

Documents 50, 50a, 50b, 50c, 50d, 50e, and 50f are shown in various positions in the image capture apparatus 20. The documents 50 are shown as a stack under the feeder 22. The documents 50a, 50b, 50c and 50f are shown in a spaced relationship along the length of the document transport member 26. The documents 50d and 50e are shown in an overlapped condition.

In operation, the image capture apparatus 20 uses conventional means such as belts and rollers (both not shown) to transport the documents 50 from a stack in the tray 21 of the document feeder 22 through the document scanner 24. The documents 50 are fed in by the document feeder 22 by a counterclockwise rotation of a feed roller (not shown) whereby the topmost of a stack of the documents 50 is drawn in the direction of the scanner 24. Disposed beneath the feed roller in opposition thereto is a retard roller (not shown) which also rotates counterclockwise so as to urge the documents 50 below the topmost one back towards the tray 21. By this arrangement, the documents 50 from the stack are supplied to the document transport member 26 one by one at prescribed intervals.

As each of the documents 50 is fed onto the document transport member 26, an individual length of each of the documents 50 is measured by means of an input document length measurement means that comprises the first photosensor 28, the timer 36 and the first memory section 38. These elements are employed to sequentially determine and store the input lengths in the second memory section 40. In addition, the lengths of the transported documents 50 are also measured during transport by a transported document length measurement means comprising the second photosensor 30, the timer 36 and the first memory section 38. The transported document length is based on detection of the surface continuity of the documents 50 in transport. Input document lengths stored in the second memory section 40 are then retrieved by a retrieval section 42 in the control unit 32 and compared by the comparator 44 with the corresponding transported document lengths. If a transported document length is found to be longer than the input document length, it is determined that during the transport process documents have come into contact or are overlapping. In this case, the correction unit 34 is activated and halts transport of the documents 50.

Figure 4:
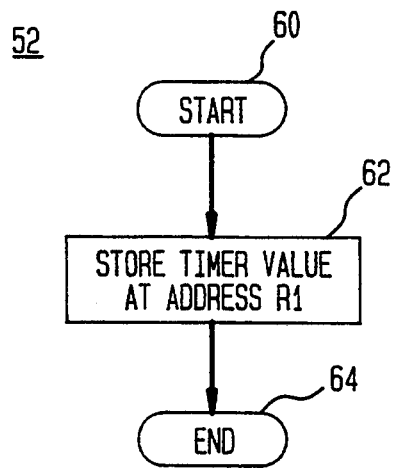
FIG. 4 is a flowchart that shows a portion of the operation of apparatus of FIG. 3.
Figure 6:
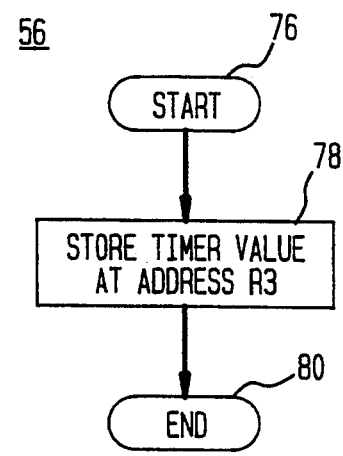
FIG. 6 is a flowchart that shows a portion of the operation of the apparatus of FIG. 3.
Figure 5:
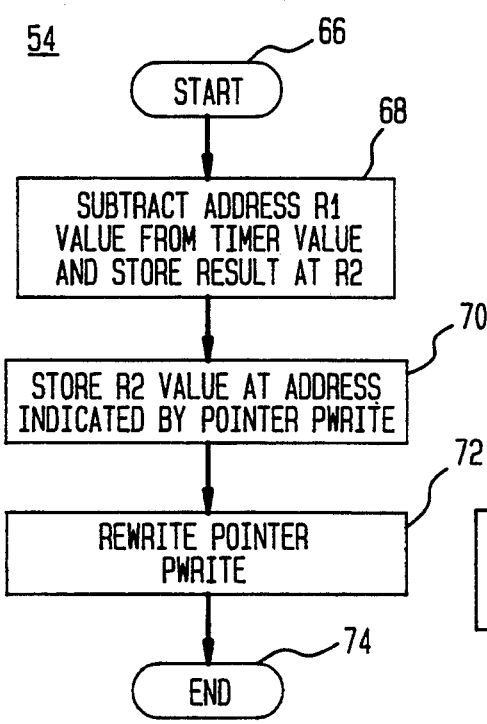
FIG. 5 is a flowchart that shows a portion of the operation of the apparatus of FIG. 3.
Figure 7:
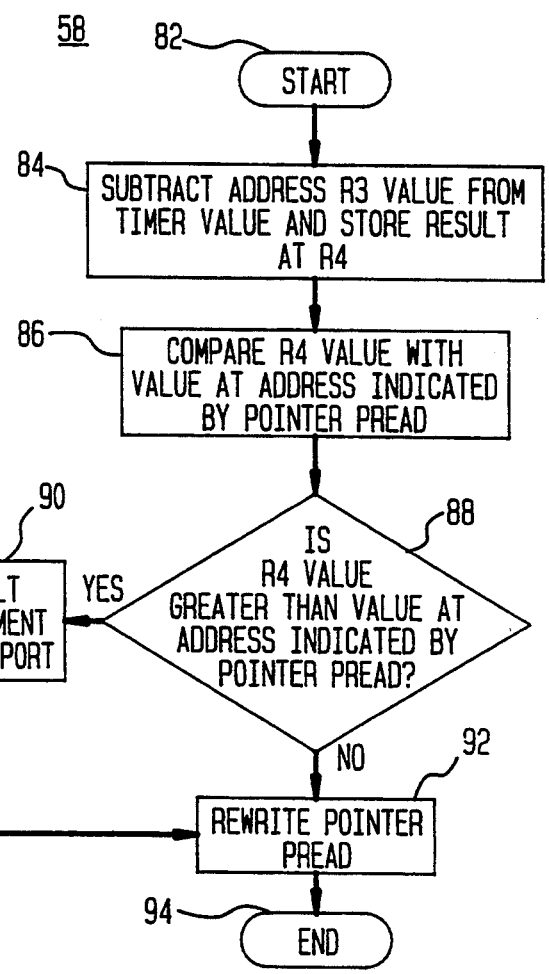
FIG. 7 is a flowchart that shows a portion of the operation of the apparatus of FIG. 3.

Referring now to FIGS. 4, 5, 6 and 7, there are shown flow charts which illustrate details of the operation of the inventive image capture apparatus 20. FIG. 4 is a flow chart of an input document leading edge interrupt processing sequence 52. The sequence 52 comprises a start step 60, an intermediate step 62, and an end step 64. FIG. 5 is a flow chart of an input document trailing edge interrupt processing sequence 54. The sequence 54 comprises a start step 66, intermediate steps 68, 70, and 72, and an end step 74. FIG. 6 shows a transported document leading edge interrupt processing sequence 56. The sequence 56 comprises a start step 76, an intermediate step 78, and an end step 80. FIG. 7 shows a flow chart of a transported document trailing edge interrupt processing sequence 58. The sequence 58 comprises a start step 82, intermediate steps 84, 86, 88, 90, and 92 and an end step 94. A Pointer PWRITE is used as the name of a memory variable used during measurement of the input document length, and a Pointer PREAD is used as the name of a comparison variable used during comparison of input document length with transported document length.

The documents 50 of FIG. 3 are supplied at prescribed intervals from the document feeder 22 of FIG. 3 and are designated document 50a, document 50b, document 50c, ... The length of one of the documents, say document 50a, is measured by the input document length measurement means of FIG. 3 that comprises the first photosensor 28 of FIG. 3, the timer 36 of FIG. 3 and the first memory section 38 of FIG. 3. A leading edge of the document 50a reaching the location of the first photosensor 28 starts the sequence 52 of FIG. 4, the input document leading edge interrupt processing. In the step 60 the first photosensor 28 is switched on and in the step 62 a timer value t1 is stored in the first memory section 38 at a specific address R1. After the value t1 is stored, the sequence 52 is ended in the step 64.

As a trailing edge of the document 50a moves past the first photosensor 28, the sequence 54 of FIG. 5 starts, input document trailing edge interrupt processing. In the step 66, the first photosensor 28 is switched off and a timer value t2 is determined. In the step 68 the timer value t1 stored at address R1 is subtracted from the timer value t2 and the result is written to an address R2 of the first memory section 38. In the step 70 the address R2 value is stored in the second memory section 40 of FIG. 3 at an address specified by Pointer PWRITE. Then, in the step 72, Pointer PWRITE is rewritten to specify the address at which the length of the next document 50b is to be stored in the second memory section 40.

Thus, the first memory section addresses R1 and R2 are reset for measurement of the length of the following document 50b. In this way the lengths of each of the individually supplied documents 50b, 50c, 50d, . . . are measured in sequence and stored in the second memory section 40 at addresses indicated by the Pointer PWRITE.

Using a similar procedure, the lengths of documents 50a, 50b, 50c, 50d, . . . in the process of being transported are measured by the transported document length measurement means of FIG. 3 comprising the second photosensor 30 of FIG. 3 (located along the transport path), the timer 36 of FIG. 3 and the first memory section 38 of FIG. 3. The leading edge of one of the documents, say 50a, reaching the second photosensor 30 of FIG. 3 starts the sequence 56 of FIG. 6, transported document leading edge interrupt processing. In the step 76 the second photosensor 30 is switched on and a timer value t3 is determined. In the step 78 the value t3 is stored in the first memory section 38 at a specific address R3. After the value t3 is stored the sequence 56 is ended in the step 80.

As the trailing edge of the document 50a passes the second photosensor 30, the sequence 58 of FIG. 7 is started, transported document trailing edge interrupt processing. In step 82 the second photosensor 30 is switched off and a times value t4 is determined. In step 84, the timer value t3 stored at address R3 is subtracted from the timer value t4 and the result is written to a specific address R4 of the first memory section 38. Next, in step 86, the input document length of document 50a stored in the second memory section 40 at an address specified by Pointer PREAD is retrieved by the retrieval section 42 of FIG. 3 and compared by the comparator 44 of FIG. 3 with the transported document length stored at address R4. If there is still a space between document 50a and document 50b such as there was when the documents were fed onto the transport member 26 of FIG. 3, the document length as measured by the input document measurement means will be the same as the document length as measured by the transported document length measurement means. In this case, it is determined, in the step 88, that document transport is proceeding normally, and the process goes to step 92 in which the Pointer PREAD is rewritten to specify the address from which the length of the following document 50b is to be retrieved for the comparison process. It can be seen that second memory section 40 of FIG. 3 must have at least as many addresses as the number of documents that can be accommodated on the document transport member 26 of FIG. 3.

If any of the documents 50 come into contact or overlap, such as in the case of documents 50d and 50e shown in FIG. 3, the length of the leading overlapped document, in this case 50d, as measured by the transported document length measurement means, will be the length of document 50d plus an exposed length of the document 50e. Thus, when comparison by the comparator 44 shows that the length of the document 50d as measured by the transported document length measurement means is longer than the length of the document length as measured by the input document length measurement means, it is determined, in the step 88, that overlapping has occurred and in step 90 activation of the correction unit 34 of FIG. 3 occurs.

When the correction unit 34 is activated, transport of the documents 50 is halted. The overlapping of the documents 50d and 50e documents is corrected and the transportation operation is restarted. The process goes to the step 92. In the step 92 the Pointer PREAD is rewritten to specify the address from which the length of the document 50e is to be retrieved for the comparison process. At this point, first memory section addresses R3 and R4 are reset for the measurement of the length of the document 50e.

The second photosensor 30 of FIG. 3 is positioned just before the scanner 24. In this arrangement, a discovery of an overlapped condition may occur after part of one of the overlapped documents has been scanned. When this occurs, it is necessary to discard that scanned data.

The need to discard scanned data can be avoided if the presence of an overlapped condition is found prior to the time that one of the overlapped documents is scanned. This can be accomplished by providing additional length measuring means along the transport men,her 26 to detect an overlapped condition earlier. Indeed a plurality of the length measuring means can be provided to operate in a sequential and coordinated manner.

It is to be appreciated and understood that the specific embodiments of the invention are merely illustrative of the general principles of the invention. Various modifications may be made by those skilled in the art which are consistent with the principles set forth. For example, although in the above description the same timer 36 is used by both the input document length measurement means and the transported document length measurement means, and the indicated values of timer 36 are stored at a specific address in the first memory section 38, if the photosensor of each measurement means is provided with its own timer and these timers are reset for each scanning operation, the first memory section 38 can be dispensed with. Still further, it is possible to dispense with the entire input document length measuring means if the inventive apparatus is used to scan only documents which are substantially equal in length.

What is claimed is:

1. Document transport apparatus for transporting documents comprising:
   input document length measurement means provided at a document input section of the document transport apparatus for measuring the length of each document;
   at least one transported document length measurement means, of the same type as the document length measurement means, positioned downstream of the input document length measurement means for measuring the length of transported documents by detecting the surface continuity of documents in transport;

comparison means for sequentially comparing the input document length with the transported document length for each document and outputs a comparison signal;

transport stopping means, which receives the comparison signal, for halting document transport when a transported document length measurement is longer than the input document length measurement for the same document.

2. Document transport apparatus for transporting document comprising:

input document length measuring means for measuring length of each document at an input end of the apparatus;

memory means for storing the lengths measured by the input document length measurement means;

at least one transported document length measurement means of the same type as the input document length measuring means, positioned downstream of the input document length measuring means for measuring the length of each of the documents after the document has been transported;

retrieval means for retrieving from the memory means the input document length of each document measured by the input document length measurement means and the transported document measurement means;

comparison means for sequentially comparing the input document length with the transported document length of each document and outputting a comparison signal; and correction means, which receives the comparison signal, for halting document transport when a transported document length is longer than an input document length.

3. The document transport apparatus of claim 2 further comprising a plurality of the transported document measurement means.

4. An image capture apparatus having document transport means that provides continuous transport of documents with a prescribed spacing therebetween, the transport means comprising:

input document length measuring means for measuring length of each document at an input end of the apparatus;

memory means for storing the lengths measured by the input document length measurement means;

at least one transported document length measurement means, of the same type as the input document length measuring means, positioned downstream of the input document length measurement means for measuring the length of each of the documents after the document has been transported;

retrieval means for retrieving from the memory means the input document length of each document measured by the input document length measurement means and the transported document measurement means;

comparison means for sequentially comparing the input document length with the transported document length of each document and outputting a comparison signal; and correction means, which receives the comparison signal, for halting document transport when a transported document length is longer than an input document length.

5. The image capture apparatus of claim 4 further comprising:

a scanner; and the transported document length measurement means being located a sufficient distance from the scanner so as to preclude any scanning of an overlapped document.

6. The apparatus of claim 5 wherein scanning of the overlapped document is precluded by halting transport of the overlapped document.

7. The image capture apparatus of claim 5 further comprising:

a scanner; and a plurality of the transported document length measurement means, at least one of which is located a sufficient distance from the scanner so as to preclude any scanning of an overlapped document.

8. The apparatus of claim 7 wherein scanning of the overlapped document is precluded by halting transport of the overlapped document.

* * * * *